(12) United States Patent
Zhou

(10) Patent No.: US 6,704,477 B2
(45) Date of Patent: Mar. 9, 2004

(54) OPTICAL SWITCH

(75) Inventor: Mingbao Zhou, Shenzhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 227 days.

(21) Appl. No.: 10/295,602

(22) Filed: Nov. 14, 2001

(65) Prior Publication Data

US 2003/0095742 A1 May 22, 2003

(30) Foreign Application Priority Data

Mar. 29, 2002 (TW) ........................ 91204046 U

(51) Int. Cl.[7] ................................................ G02B 6/26
(52) U.S. Cl. ........................................................ 385/22
(58) Field of Search ........................ 385/16, 20, 22, 385/31, 33, 36, 39, 147; 369/112.01, 112.27, 107, 44.32

(56) References Cited

U.S. PATENT DOCUMENTS 6,587,421 B1 * 7/2003 Wilde et al. .......... 369/112.01
2003/0081897 A1 * 5/2003 Itoh et al. ..................... 385/34

* cited by examiner

Primary Examiner—Akm Enayet Ullah
(74) Attorney, Agent, or Firm—Wei Te Chung

(57) ABSTRACT

An optical switch (1) for switching light beams between one input optical fiber (21) and a plurality of output optical fibers (31) has a first port (2), a second port (3) and a switching element (4) between the first and second ports. The input port aligns with the input optical fiber and collimates input light beams. The output port aligns with the output fibers and decollimates output light beams. The switching element includes at least one rotatable optical element (41) for deflecting the light beams and a holder (42) for containing the rotatable optical elements. The rotatable optical element is rotatable among a plurality of positions, whereby, when the optical element is in different positions, the light beams from the input optical fiber are switched to different output fibers, respectively.

11 Claims, 5 Drawing Sheets

OPTICAL SWITCH

BACKGROUND OF THE INVENTION

1. Field of the Invention

The present invention relates to an optical switch for use in optical communication and optical network technology, and particularly to a mechanically operated optical switch with a rotatable prism as a switching element. A copending application having the same filing date, the same title, the same applicant and the same assignee with the invention, is referenced hereto.

2. Description of Related Art

Optical signals are commonly transmitted in optical fibers, which provide efficient light channels through which optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

In optical fiber systems, various methods have been previously developed for switching optical signals between fiber cables. Among these previously developed methods, one imcollimatorant category is mechanical optical switches.

Mechanically operated optical switches come in two different designs: in one design, the optical components move, and in the other design, the fibers move. Factors for assessing the capability of an optical switch include low insertion loss (<1 dB), good isolation performance (>50 dB) and bandwidth capacity compatible with the fiber network that the switch is supporting.

Moving fiber switches involve the actual physical movement of one or more of the fibers to specific position to accomplish the transmission of light beams from one fiber end to another under selected switching conditions. Moving optical component switches, on the other hand, include optical collimating lenses which expand the light beam coming from the fibers, and then, using moving prisms or mirrors, redirect the expanded light beam to other fibers, as required by the switching process.

The moving fiber switches have a stringent tolerance requirement for the amount and direction of fiber movement. The tolerance is typically a small fraction of the fiber core diameter for two fibers to precisely collimate to reduce loss. The fibers themselves are quite thin and may be subject to breakage of not properly protected. On the other hand, reinforcing the fibers with stiff protective sheaths makes the fibers less flexible, increasing the force required to manipulate each fiber into alignment. Thus these moving fiber switches share a common problem of requiring high precision parts to obtain precise position control and low insertion loss. This results in high cost and complicated manufacture of the switches. Moreover, frequently moving fibers to and fro is apt to damage or even break the fibers.

The moving optical component switches, in contrast, have less stringent movement control tolerance requirements. The presence of collimating lenses allows relaxation of the tolerance requirements.

As illustrated in FIG. 6, U.S. Pat. No. 5,420,946, describes an optical coupling switch for coupling light from an input fiber 611 into a selected output collimator 620. The input fiber 611 is optically aligned with one of a plurality of output fibers 621 via a reflector 630. By rotating the reflector 630 about an axis, the input light beams can be reflected to a selected output fiber 621. The input fiber 611 and all the output fibers 621 are in fixed position relative to each other.

In this mechanical switch, the plurality of output fibers 621 are separately mounted on a platform 600, which makes the structure of the switch complex and large, and which do make the aligning process between the input fiber 611 and the plurality of output fibers 621 time consuming. In addition, this prior art mechanical switch uses a plurality of GRIN lenses (622, 612) on front ends of the output fibers 621 and the input fiber 611 to collimate the light beams. All the GRIN lens goatly add cost to the mechanical switch greatly.

For the above reasons, an improved optical switch is desired. In particularly, an optical switch is desired which has low cost, high optical efficiency and which does not require precise alignment or movement of the optical fibers themselves.

SUMMARY OF THE INVENTION

An object of the present invention is to provide an optical switch in which the optical fibers don't move.

Another object of the present invention is to provide an optical switch which allows easy alignment of associated fibers and which has a high optical efficiency.

Yet another object of the present invention is to provide an optical switch which is low in cost and small in size.

An optical switch in accordance with one embodiment of the present invention, for switching light beams between one input optical fiber and a plurality of output optical fibers, comprises a first collimator aligning with the input optical fiber and collimating input light beams; a second collimator aligning with the output fibers and collimating output light beams; and a switching element between the first and second collimators comprising at least one rotatable optical element for deflecting the light beams and a holder for containing the rotatable optical elements, the rotatable optical element being rotatable among a plurality of positions; whereby, when the optical element is in different positions, the light beams from the input optical fiber are switched to different output fibers, respectively.

Other objects, advantages and novel features of the invention will become more apparent from the following detailed description when taken in conjunction with the accompanying drawings.

BRIEF DISCRIPTION OF THE DRAWINGS

DETAILED DESCRIPTION OF THE INVENTION

Figure 1:
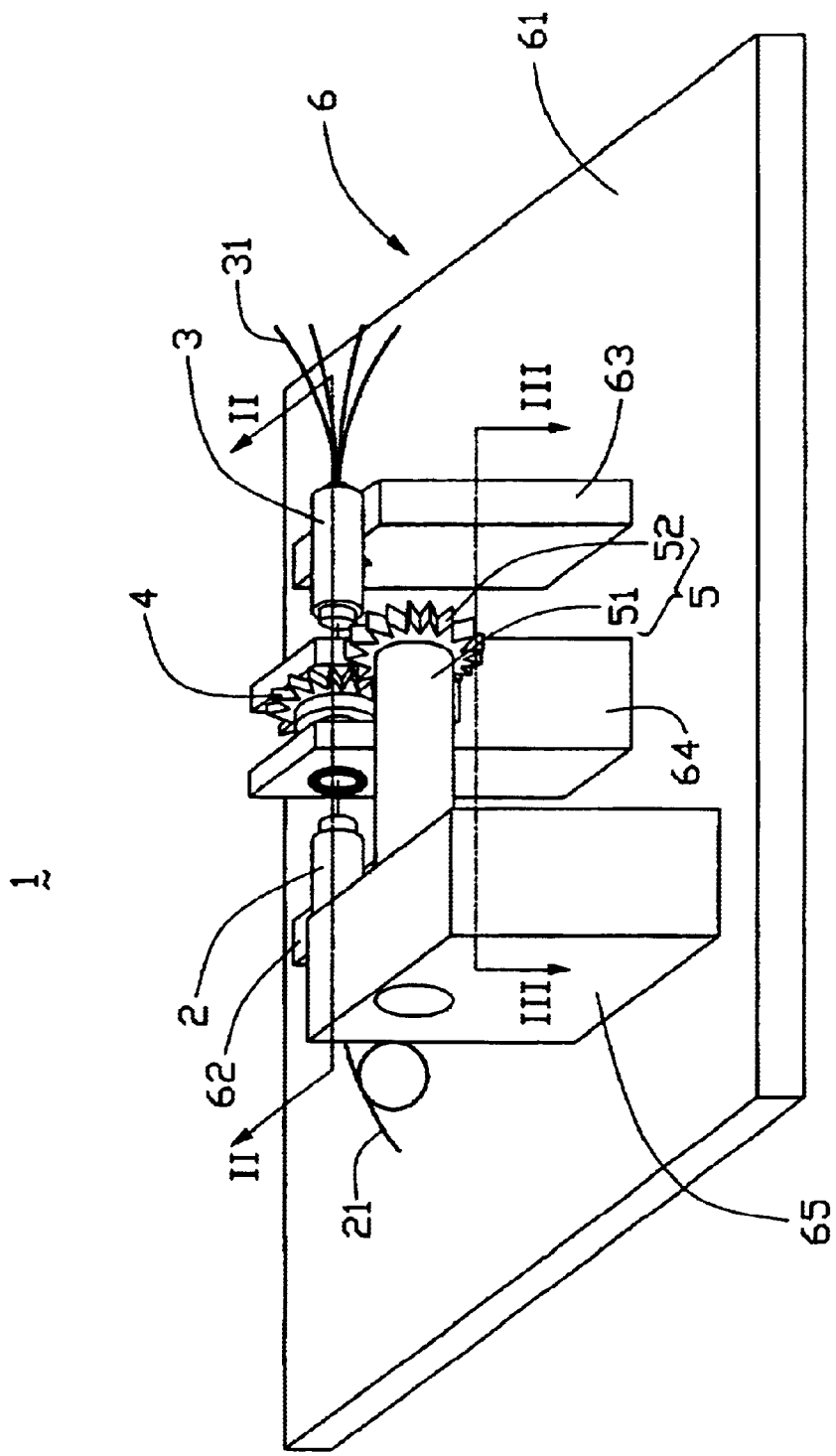
FIG. 1 is a perspective view of an optical switch according to the present invention.

Referring to FIG. 1, an optical switch 1 according to the present invention is used to switch light beams between an input optical fiber 21 and a plurality of output optical fibers 31. The optical switch 1 comprises an input port 2 with the input optical fiber 21, an output port 3 terminating the plurality of output optical fibers 31, a switching element 4 switching light beams from the input optical fiber 21 to different output fibers 31, a driving means 5 and a base 6 mounting the input port 2, the output port 3 and the switching element 4 and the driving means 5, thereon.

Figure 2:
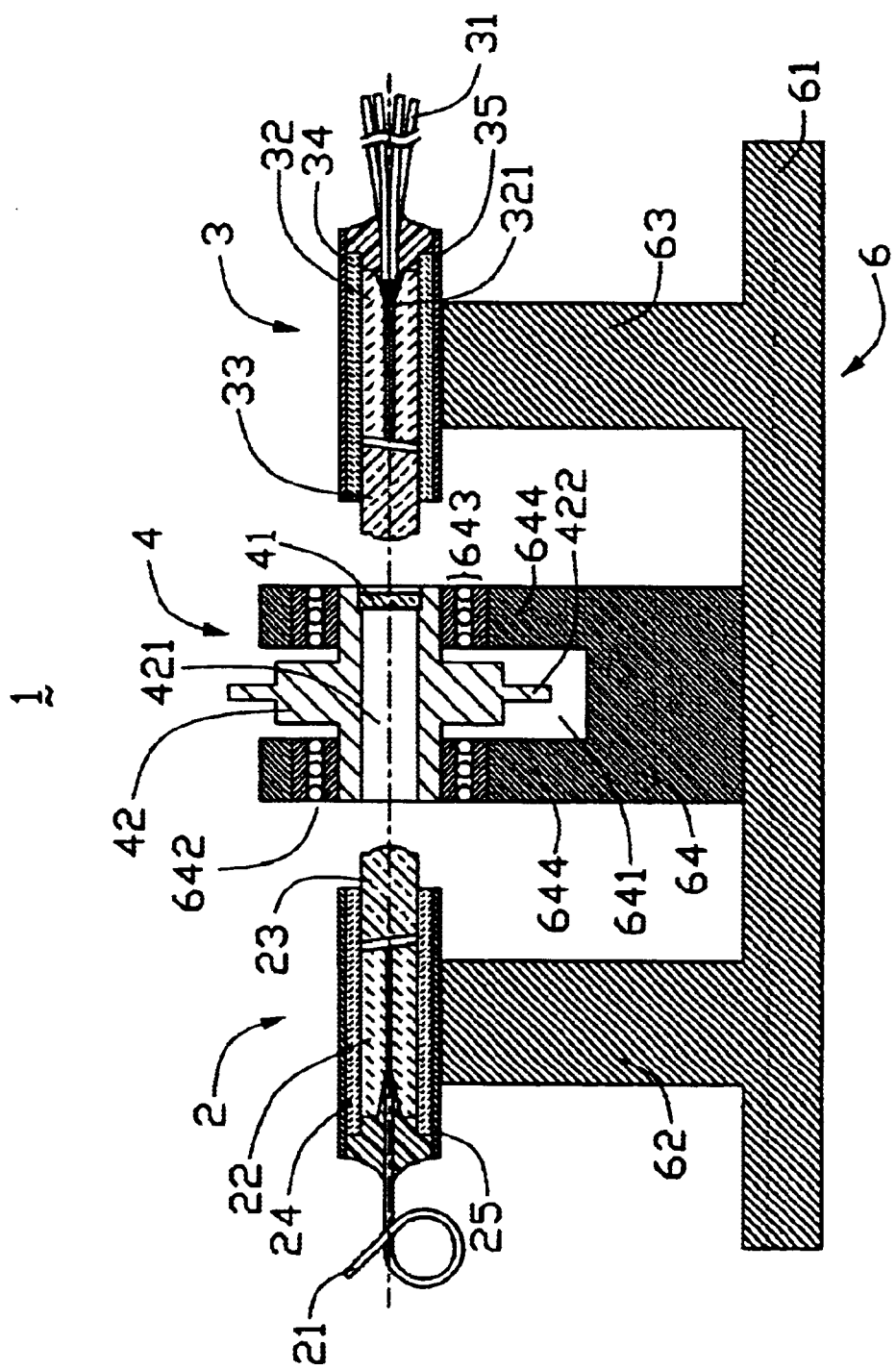
FIG. 2 is a cross-sectional view taken along the line II—II in FIG. 1.
Figure 3:
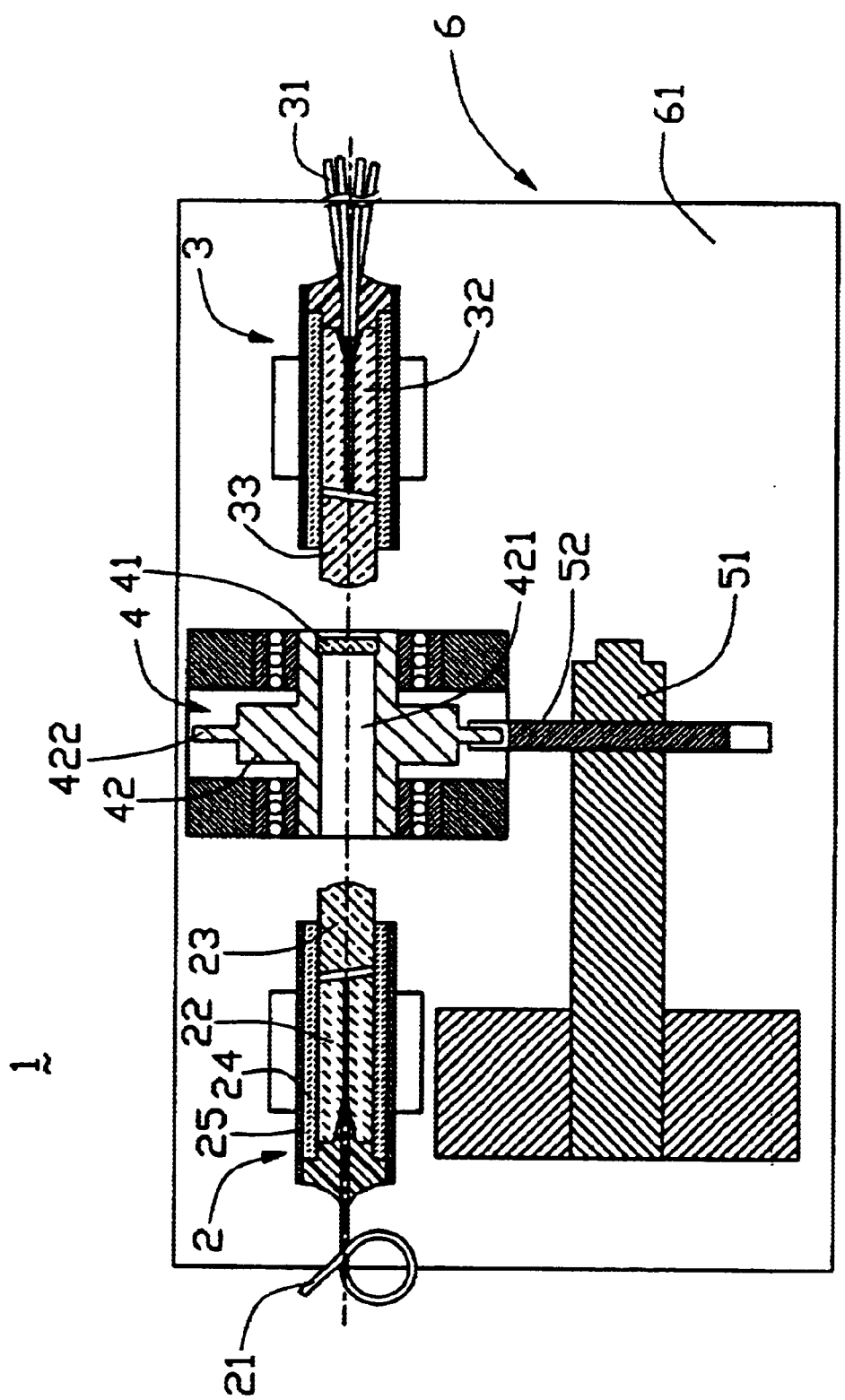
FIG. 3 is a cross-sectional view taken along the line III—III in FIG. 1.

As shown in FIGS. 1, 2 and 3, the base 6 has a substrate 61 and four upright beams (62, 63, 64, 65) extending upwardly from the substrate 61. The upright beams (62, 63, 64) are arranged in a line for coaxial alignment of the input port 2, the output port 3 and the switching element 4. The upright beam 64 has two arms 644 and defines a mounting hole 642 in each respective arm 644. A recess 641 is further defined between the two arms 644. Each mounting hole 642 accommodates a roller bearing 643, wherein an outside diameter of each roller bearing 643 is equal to an inside diameter of the mounting hole 642. Each roller bearing 643 is held fixed in its respective the mounting hole 642 by a frictional fit between an outer sidewall (not labeled) of the roller bearing 643 and an inner sidewall (not labeled) of the mounting hole 642.

The switching element 4 comprises a rotatable prism 41 and a holder 42 containing the rotatable prism 41 therein. The prism 41 has a different refractive index from circumambient media and two antiparallel surfaces (not labeled) for deflecting light beams. The holder 42 has a column body (not labeled) with a through hole 421 extending longitudinally therethrough. The prism 41 is accommodated and fixed in the through hole 421. The holder 42 further includes a gear wheel 422, which extends outwardly from a central section of the column body (not labeled).

The input port 2 comprises an input fiber pigtail 22, an collimator 23 aligning with the input fiber pigtail 22, and a quartz sleeve 24 receiving and fixing the collimator 23 and the input fiber pigtail 22. The input port 2 further has a metal tube 25 surrounding the quartz sleeve 24 for protecting the input port 2. The collimator 23 can be a molded lens with a single index of refraction or a GRIN lens, which partially extends out of the quartz sleeve 24. The input fiber pigtail 22 defines a through hole (not labeled) for accommodating the input optical fiber 21.

The output port 3 is just like the input port 2 having an output fiber pigtail 32, a collimator 33, and a quartz sleeve 34 receiving and fixing the output fiber pigtail 32 and the collimator 33, wherein the collimator 33 partially extends out of the quartz sleeve 34. The collimator 33 can be a molded lens with a single index of refraction or a GRIN lens aligning with the output fiber pigtail 32. The output fiber pigtail 32 has a through hole 321 accommodating and fixing a plurality of output optical fibers 31. A metal tube 35 surrounds the quartz sleeve 34 to protect the output port 3.

The optical switch 1 further includes a driving means 5 for driving the switching element 4 to rotate. The driving means 5 has a driving pole 51 and a gear wheel 52 mounted on the driving pole 51. The driving means 5 is supposed by the upright beam 65 and is driven by an outside motive force.

In assembly, the driving means 5, the input port 2, the output port 3 and the switching element 4 are fixed on the four upright beams (65, 62, 63, 64), respectively. The three upright beams (62, 63, 64) are in a line with each other, the two ports (2, 3) and the prism 41 of the switching element 4 are coaxial with each other. The two antiparallel surfaces of the prism 41 are arranged to intercept light traveling between the two molded lenses (23, 33) of the input and output ports (2, 3), respectively. The switching element 4 is rotatably mounted in the upright beam 64, with the column body of the holder 42 being supported at each of two opposite ends by the two roller bearings 643 and the gear wheel 422 of the holder 42 being received in the recess 641 between the two arms 644 of the upright beam 64. The driving means 5 electrically connects with a stepping motor or other motive force (not shown) and drives the switching element 4 to rotate by moves of teeth (not latched) of the gear wheel 52 of the driving device 5 meshing with the teeth (not latched) of the gear wheel 422 of the switching element 4.

When the driving means 5 is actuated to rotate, the switching element 4 is driven to rotate, whereby, the prism 41 can be rotated to a plurality of positions. Since light traveling from the collimator 23 to the collimator 33 passes through the prism 41, the antiparallel surface of the prism 41 will bend the light passing there through. The prism can be made and positioned to switch the light coming from the input optical fiber 21 between different output optical fibers 31 as the prism rotates between varying positions. So, the refracted input light beams can be switched between different output optical fibers 31.

Figure 4:
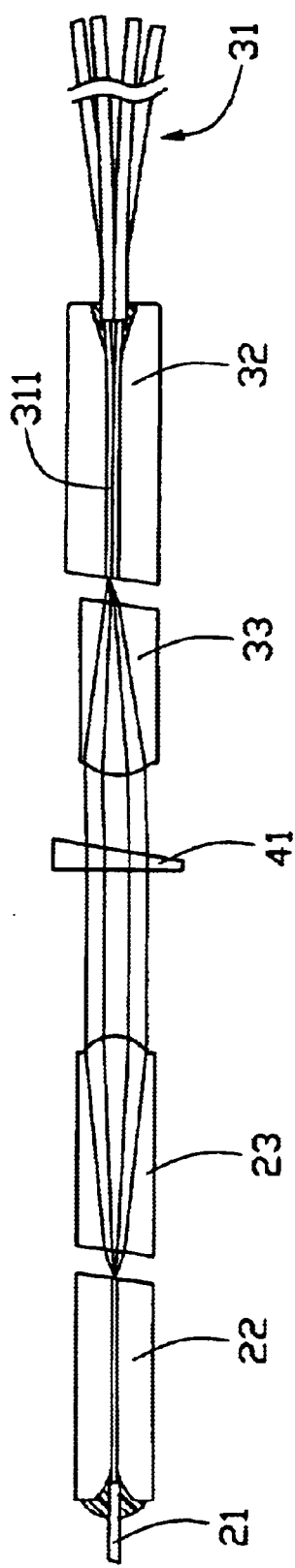
FIG. 4 is an essential optical paths diagram of the optical switch in FIG. 1 in a first position.
Figure 5:
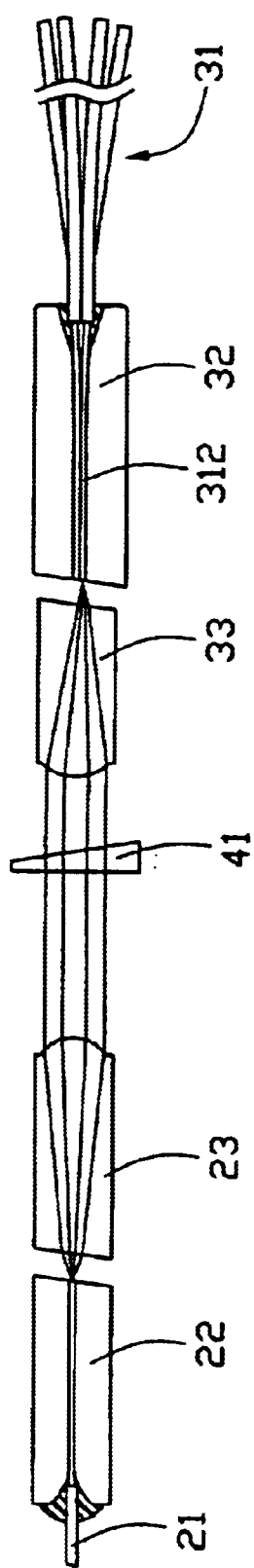
FIG. 5 is an essential optical paths diagram of the optical switch in FIG. 1 at second position.
Figure 6:
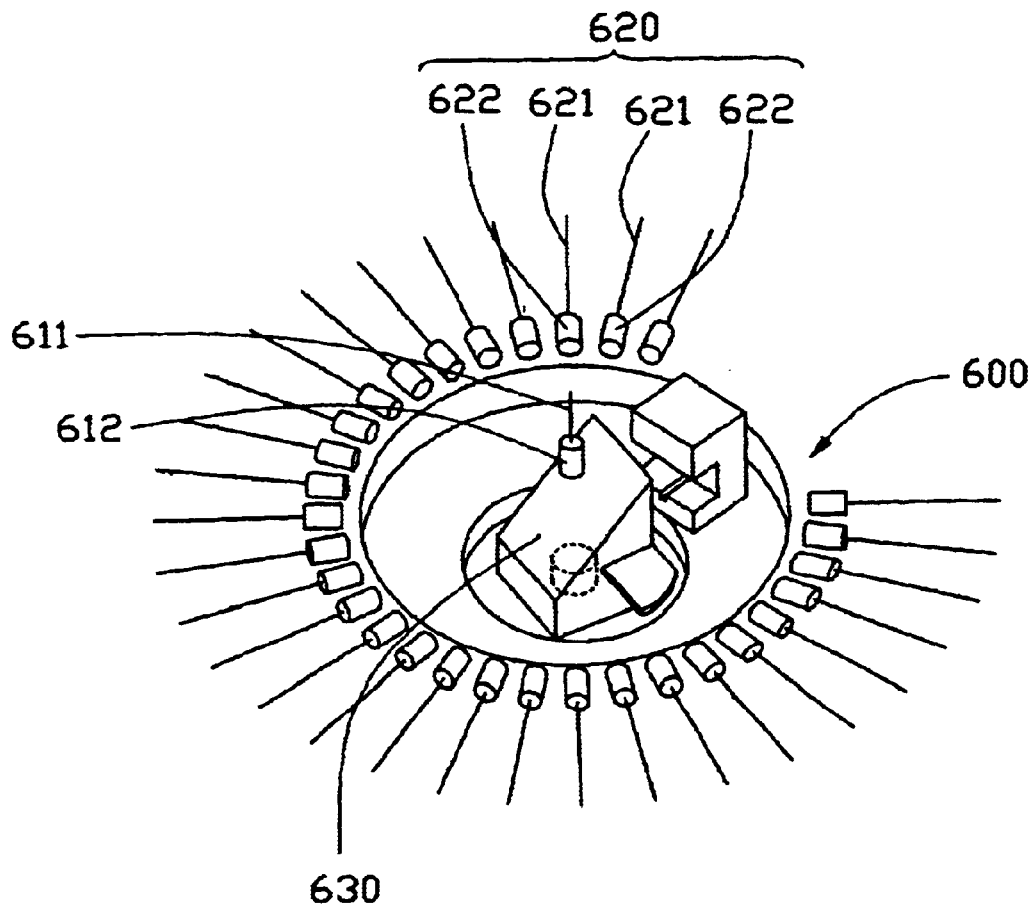
FIG. 6 is a perspective view of a prior art mechanical optical switch.

FIG. 4 and FIG. 5 illustrate the operation of the optical switch 1. when the switching element 4 is in a first position, the input light beams from the input optical fiber 21 transmit through the input collimator 23, which collimate the dispersed input light beams into parallel light beams. The collimated light beams are then transmitted through the prism 41, which refracts and deflects the parallel light beams in a predetermined direction. The light beams then pass through the output collimator 33, which converges the light beams into one predetermined output optical fiber 311. When the switching element 4 is in a second position, the prism 41 is rotated to a second position and the input light beams are switched in a second predetermined direction by the prism 41 and converge onto another output optical fiber 312.

Advantages of the optical switch 1 of the present invention over those of the prior art include the following. First, only optical components of the switch move; no fibers move. Second, the input and output collimators are easily aligned with one another. Third, using one optical pigtail to accommodate a plurality of output optical fibers decreases the size of the switch and lessens its costs, particularly since only one molded lens or GRIN lens is required to converge the output light. Thus, the cost and the size of a switch of the present invention are minimized.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An optical switch for switching light beams between one input optical fiber and a plurality of output optical fibers, comprising:
    a first collimator for aligning with the input optical fiber and collimating input light beams;
    a second collimator for aligning with the output optical fibers and decollimating output light beams; and
    a switching element arranged between the first and second collimators comprising at least one rotatable optical element, the rotatable optical element being rotatable among a plurality of positions; whereby, when the optical element is in different positions, the light beams from the input optical fiber are switched to reoperative different output optical fibers.

2. The optical switch of claim 1, wherein the first and second collimators are molded lenses with a single index.

3. The optical switch of claim 1, wherein the first and second collimators are GRIN (Graded Index) lenses.

4. The optical switch of claim 1, wherein the optical element is a prism with two antiparallel surfaces.

5. The optical switch of claim 4, wherein the switching element further comprises a holder to receive the optical element.

6. The optical switch of claim 5, wherein the holder has a through hole for fixing the prism, therein.

7. The optical switch of claim 1, wherein the optical switch further comprises two fiber pigtails for respectively containing the input and the output fibers, and the pigtails align the input and output fibers with the respective first and second collimators, respectively.

8. The optical switch of claim 1, wherein the optical switch further comprises a driving means electrically connected with a stepper for driving the switching element.

9. The optical switch of claim 8, further comprising a base for mounting the first and second collimators, the switching element and the driving means thereon.

10. An optical switch for switching light beams between one input optical fiber and a plurality of output optical fibers, comprising:

a first collimator for aligning with the input optical fiber and collimating input light beams;

a second collimator for aligning with the output optical fibers and decollimating output light beams; and a rotatable optical element arranged between the first and second collimators;

the rotatable optical element having a different refractive index from circumambient media and two antiparallel surfaces, which is rotatable among a plurality of positions; whereby, when the optical element is in different positions, the light beams from the input optical fiber are switched to reoperative different output optical fibers.

11. An optical switch for switching light beams between one input optical fiber and a plurality of output optical fibers, comprising:

a first collimator for aligning with the input optical fiber and collimating an input light beam;

a second collimator for aligning the output optical fibers and collimating output light beams;

a rotatable optical element arranged between the first and second collimators, and defining a rotation center with a plurality of different refractive indexes regions around said rotation center, the different refractive indexes regions respectively and mutually exclusively being rotatably moved to a specific position where each of said regions receives signals of said single input light beam while transmits said signals to only corresponding one of said output optical fibers to result in only corresponding one of said output light beams; wherein the rotation center is generally aligned with axes of said first and second collimators.

* * * * *